(12) United States Patent
Jones

(10) Patent No.: US 8,157,499 B1
(45) Date of Patent: Apr. 17, 2012

(54) CONTAINERIZED FREIGHT SYSTEM

(76) Inventor: Jack Jones, Roscommon, MI (US)

( * ) Notice: Subject to any disclaimer, the term of this patent is extended or adjusted under 35 U.S.C. 154(b) by 745 days.

(21) Appl. No.: 12/283,720

(22) Filed: Sep. 15, 2008

(51) Int. Cl.
  *B60P 1/00* (2006.01)
(52) U.S. Cl. ........................ 414/549; 414/498
(58) Field of Classification Search .............. 414/475, 414/498, 546, 549, 558
  See application file for complete search history.

(56) References Cited

U.S. PATENT DOCUMENTS

| | | | |
|---|---|---|---|
| 2,751,095 A * | 6/1956 | Haverstick et al. | 414/542 |
| 3,971,486 A * | 7/1976 | Carlsson | 414/493 |
| 5,391,043 A * | 2/1995 | Bohata et al. | 414/544 |
| 6,155,770 A * | 12/2000 | Warhurst | 414/498 |
| 7,074,004 B2 | 7/2006 | Lockamy et al. | |
| 7,241,100 B2 | 7/2007 | Lockamy | |
| 7,500,536 B2 * | 3/2009 | Bulgajewski et al. | 180/273 |
| 7,744,333 B2 * | 6/2010 | Chaddock | 414/542 |
| 2004/0191038 A1 | 9/2004 | Lockamy et al. | |
| 2006/0104802 A1 | 5/2006 | Lockamy et al. | |
| 2006/0245878 A1 | 11/2006 | Lockamy et al. | |
| 2007/0154295 A1 * | 7/2007 | Kuriakose | 414/546 |

* cited by examiner

*Primary Examiner* — Charles A Fox
(74) *Attorney, Agent, or Firm* — Robert L. McKellar; McKellar IP Law, PLLC

(57) ABSTRACT

The instant invention is a containerized freight system that is comprised in combination of a specialized container, a lift mechanism and a transportation unit or vehicle mounted lifting and transporting system of individual specialized cargo containers. The system allows delivery of specialized cargo container virtually anywhere for loading, unloading, storage and retrieval by the transportation unit. The lifting unit is unique in that leg members engage the bottom channel of the specialized container it will raise and lower the unit while keeping the container and its contents in a vertical plane preventing the shifting of the contents within the container. The system also includes a specially equipped trailer that has a bed that lowers to ground level to facilitate loading and unloading of containers. This trailer is capable of hauling at least one container.

48 Claims, 22 Drawing Sheets

CONTAINERIZED FREIGHT SYSTEM

The invention disclosed and claimed herein deals with a containerized freight system that comprises a unique container, a lifting apparatus that allows for the loading and unloading of the specialized container without the container and its contents being lifted at an angle. The system also has a specialized trailer for loading and unloading the specialized containers.

"Dumpster®" as used herein is a registered trademark of the Demster Brothers, Inc., Knoxville, Tenn.

BACKGROUND OF THE INVENTION

The use of individual container systems is not new to the art. However, the transportation and the raising of the lower mechanism of the instant invention is far more superior to the prior art making it unique and revolutionary to the art. For example, U.S. Pat. No. 7,241,100 issued to Lockamy Jul. 10, 2007 provides a lifting and transportation system for a cargo containers that relies on "One or more tethers 550 comprising, for example appropriate chains, straps or the like, are connected between each lifting member . . . ". The instant invention relies on the leg members that engage the bottom channel of the container. As the rollers pass into the channel and slide the length of the rails the container is safely engaged. This system is more efficient and safer than the prior art because once it is engaged the container is attached to the lifting mechanism. Tethers of various sorts can become detached and create a safety risk. In the Lockamy patents the lift system must be moved to the rear of the transport vehicle then lowered. The instant invention can be lowered to the ground then moved to the rear of the transport vehicle and slid into the container and then lifted. This system is unique because the lift system forks are outside of the transport vehicles rear axles. The following Patents and Publications all suffer the same inferiority, U.S. Pat. No. 7,074,004; 2006/0245878; 2006/0104802, and 2004/0191038 all in the name of Lockamy.

THE INVENTION

The instant invention is a containerized freight system that is comprises a combination of a specialized container, a lift mechanism and a transportation unit. The specialized container is comprised of a combination of a framework, 3 walls, a top, a bottom and at least one door. The frame work consists of two opposing outside channel members, two base side angle members, two base end angles, at least four upright members, two side top angled members and two top end angle members. The wall portions comprise two segments from the base angle members extending to the top angle members forming two side walls. The wall portions comprise one segment from one base end angle extending to one top end angle forming one end. Each of the wall and end segments extend along and are secured to two upright members. The top is a segment extending from the top side angle members to the top end angles forming the top. The bottom is a segment extending from the base side angle members to the base end angles forming the bottom. The door is the segment extending from the base end angle member to the top end angled member and extending along the two uprights forming the door.

The lifting mechanism comprises in combination: at least one leg tower, the leg tower has a near end, a distal end and a front surface, the front surface of the leg towers have a leg tower slot. The lift has at least one vertical hydraulic cylinder. This vertical hydraulic cylinder has a near end and a distal end. The lift has an upper tower cross member, the upper tower cross member has a near end and a distal end. The main cross member has a near end and a distal end. The lift has at least one leg member. This leg member has a near end and a distal end. The lift has at least one leg flange. This leg flange has a near end and a distal end. The lift cross member, has a near end and a distal end. The lift mechanism has at least one channel engaging lateral. The channel engaging lateral has a near end and a distal end. The lift has at least one channel engaging lateral support member. This channel engaging lateral has a near end and a distal end. The lift has at least one channel engaging lateral angled support. This channel engaging lateral angled support has a near end, a distal end, and a retaining pin.

The transportation unit comprises in combination, a vehicle with the lifting mechanism attached thereto for the purpose of loading, unloading, raising, lowering and transporting containers.

Another transportation unit comprises a trailer unit. This trailer unit has a front end, a rear end, at least one side, at least two axles, a frame, a trailer bed, a plurality of rollers and a plurality of tires. The front end consists of a hitch, a winch, a battery and a hydraulic pump. The rear end of the trailer has a beveled edge allowing for ground engagement. The sides of the trailer have a length that will accommodate at least two of the specialized containers setting end to end.

The axles of the trailer have the capability to rotate mechanically upward and downward from their original position or traveling position.

The frame to the trailer is also capable of supporting at least two specialized containers loaded or unloaded. The trailer bed is capable of supporting at least two containers whether they are loaded or empty.

The roller system can take the form of many configurations. One embodiment consists of a plurality of rollers being incorporated into the top surface of the trailer bed to facilitate the movement of the specialized containers on and off of the trailer.

The tires of the trailer are attached to the axles and support the trailer for the transportation of the specialized containers. The axles of the current embodiment carry single rims, however, it is quite conceivable that a rim that would accommodate a duel tire system would be suitable.

DESCRIPTION OF THE DRAWINGS

Figure 1:
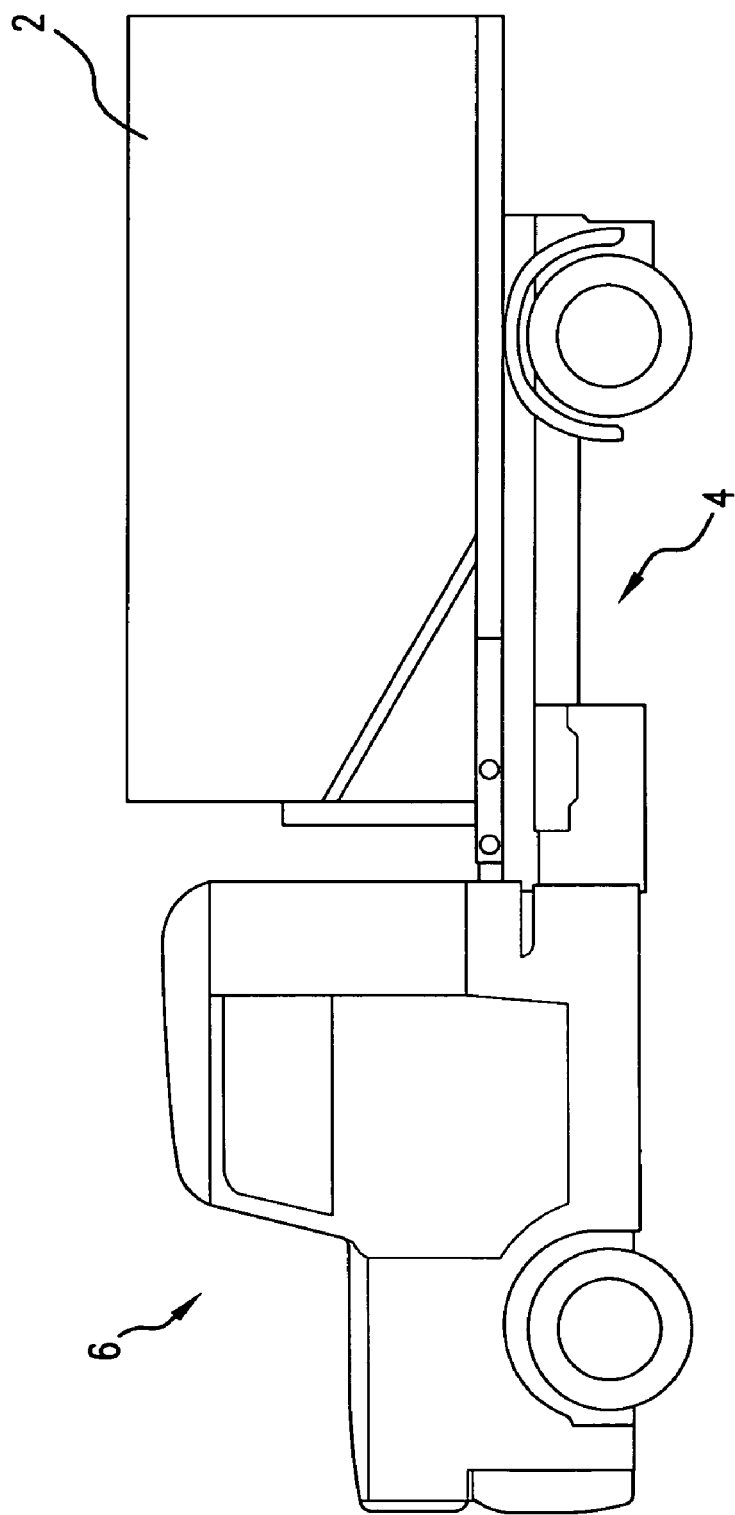
FIG. 1 is a side view of a vehicle equipped with the lift and a container.

FIG. 1 is a side view of a vehicle 6 equipped with the lift 4 and a container 2. This perspective shows the ability of the vehicle 6 to transport the container 2.

Figure 2:
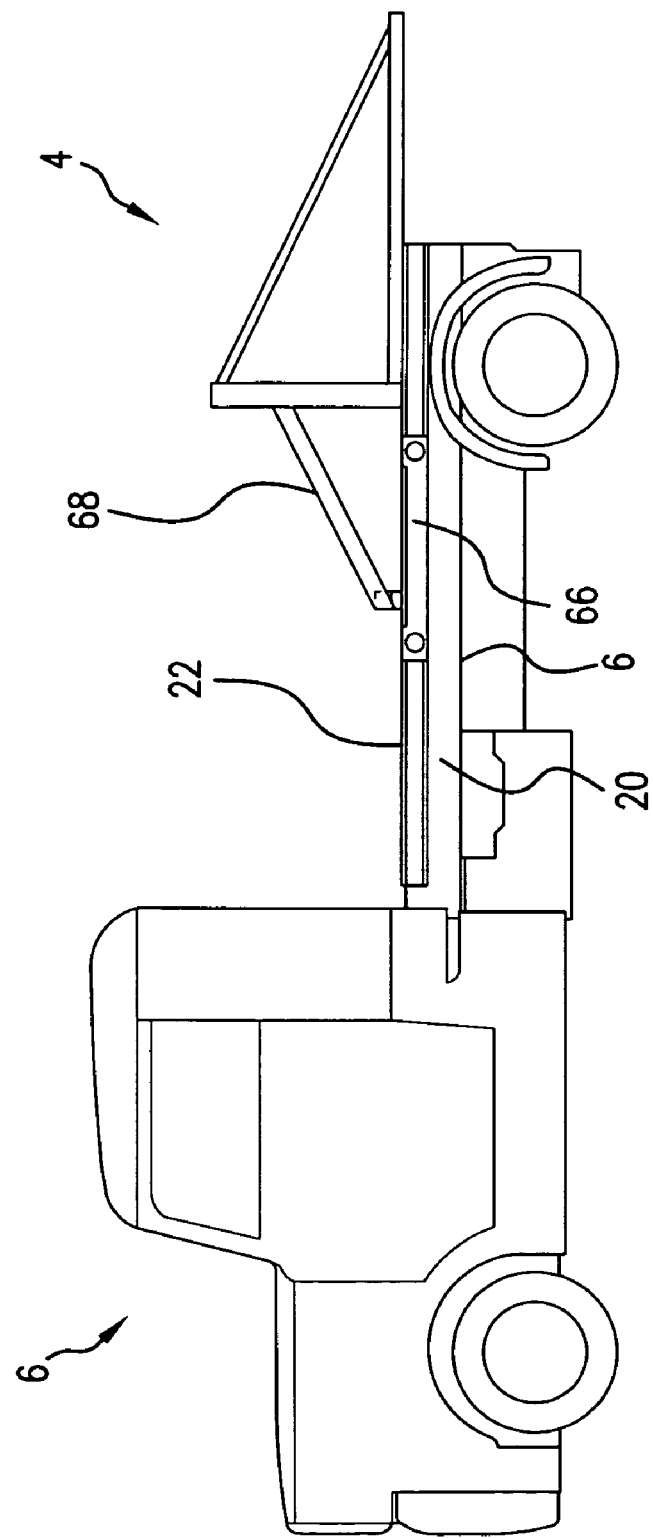
FIG. 2 is a side view of a vehicle equipped with a lift partially deployed.

FIG. 2 is a side view of a vehicle 6 equipped with a lift 4 partially deployed. The lift 4 slides along channels 22 of the vehicle 6. These rails 20 and 22 provide the lift 4 with the ability to move along the length of the vehicle 6. The lift 4 is capable of being lowered at any point along the rails 20 and 22 until it reaches the distal ends 80 and 82 of the rails 20 and 22. Also visible form this perspective is the roller frame 64. The rollers 66 are not visible but they allow the roller frame 64 to move forward and backward in the channels 22. The roller frame 64 has a support 68. The lift 4 is attached to the roller support 68 and the roller frame 64.

Figure 3:
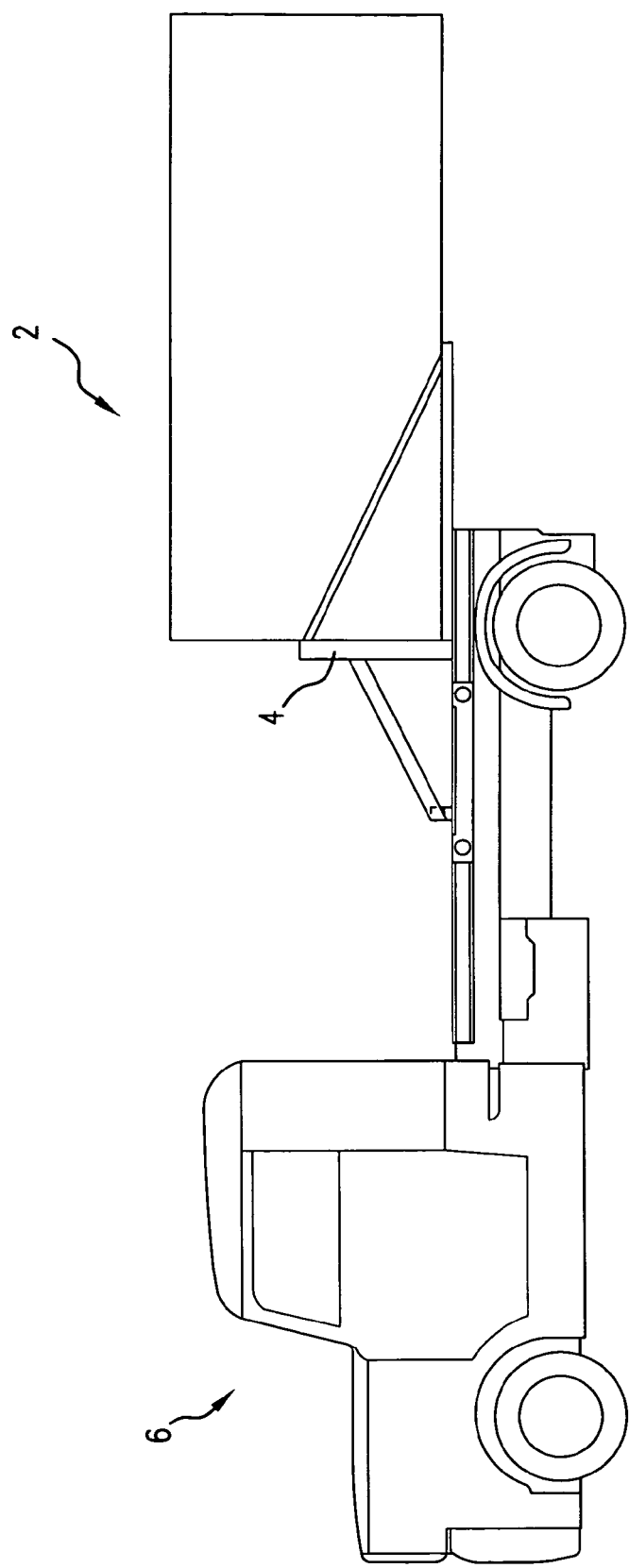
FIG. 3 is a side view of a vehicle equipped with a lift and a container partially deployed.

FIG. 3 is a side view of a vehicle 6 equipped with a lift 4 and a container 2 partially deployed. This perspective shows the container 2 on the lift 4.

Figure 4:
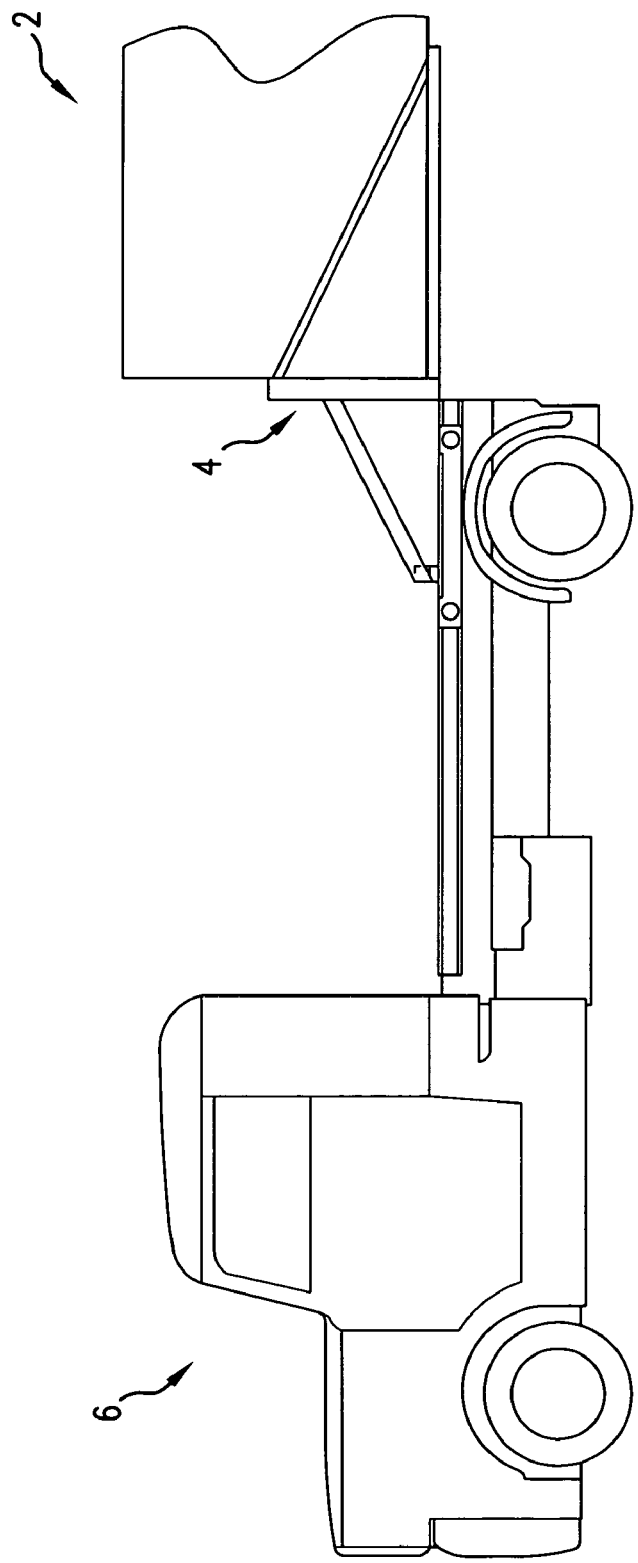
FIG. 4 is a side view of a vehicle equipped with a lift and a container fully deployed.

FIG. 4 is a side view of a vehicle 6 equipped with a lift 4 and a container 2 fully deployed. At this point the container 2 is either roller onto the vehicle 6 and secure for transport or it is lowered to the ground to be detached and utilized.

Figure 5:
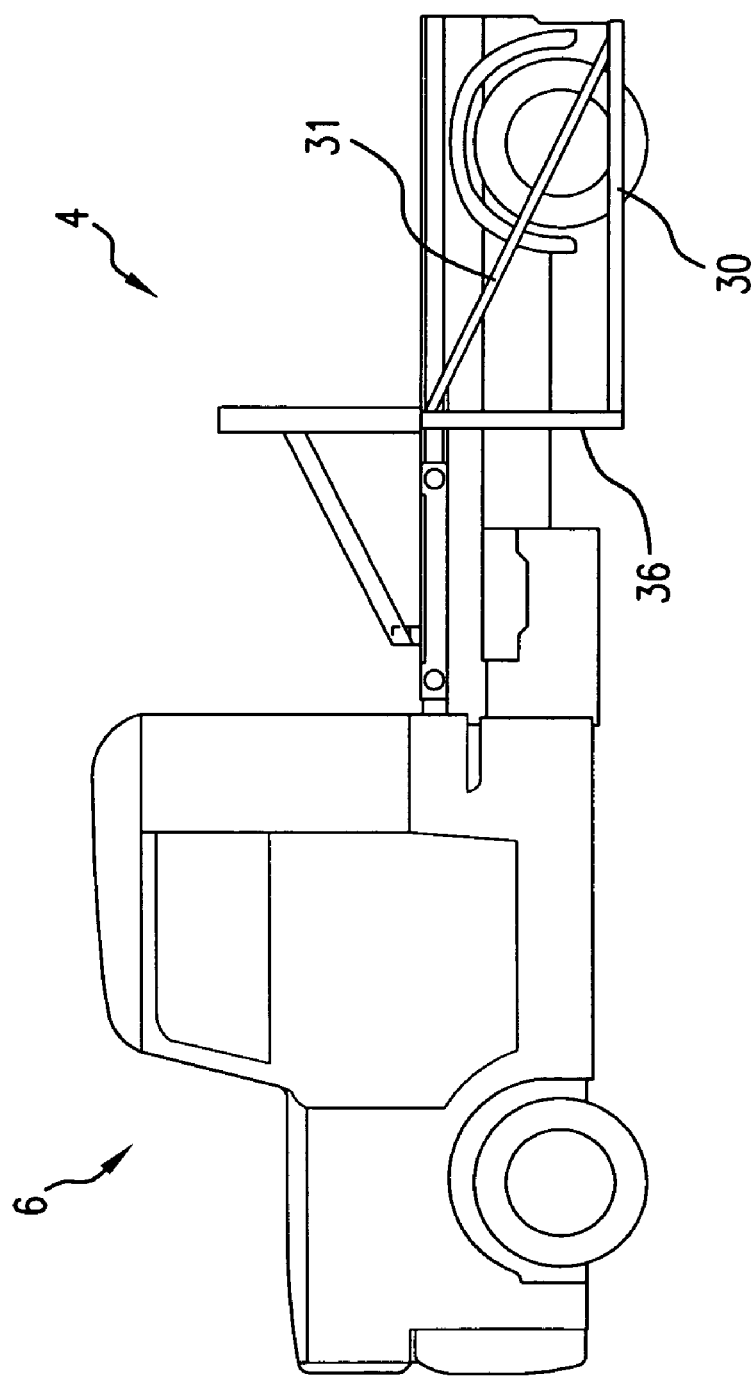
FIG. 5 is a side view of a vehicle equipped with a lift fully deployed and lower to the ground ready to engage a container.

FIG. 5 is a side view of a vehicle equipped with a lift fully deployed and lower to the ground ready to engage a container. Once the lift 4 is lowered it can be ran around a container 2 where the container 2 is secured to the arm brackets 30. Also visible is the lower leg cross 36 and lower leg cross member support 34.

Figure 6:
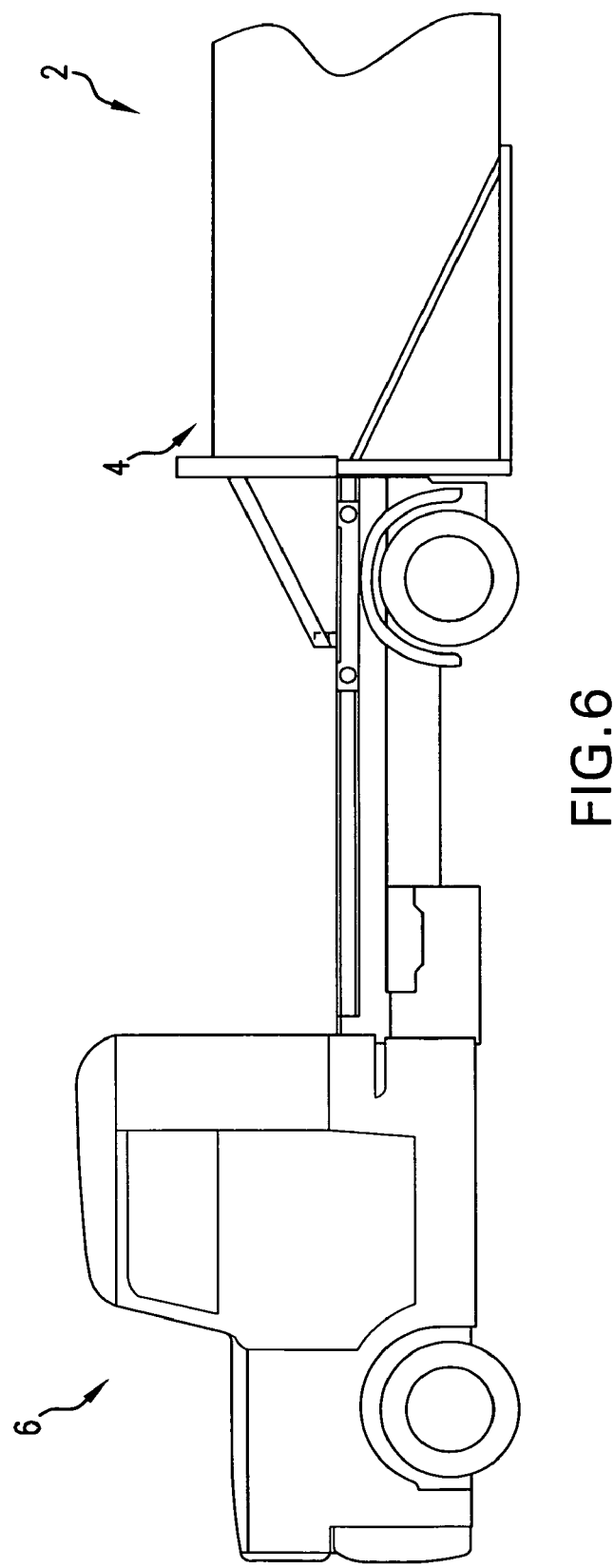
FIG. 6 is a side view of a vehicle equipped with a lift and container fully lowered and engaged ready to lift.

FIG. 6 is a side view of a vehicle 6 equipped with a lift 4 and container 2 fully lowered. From this perspective the container can be either detached or secured.

Figure 7:
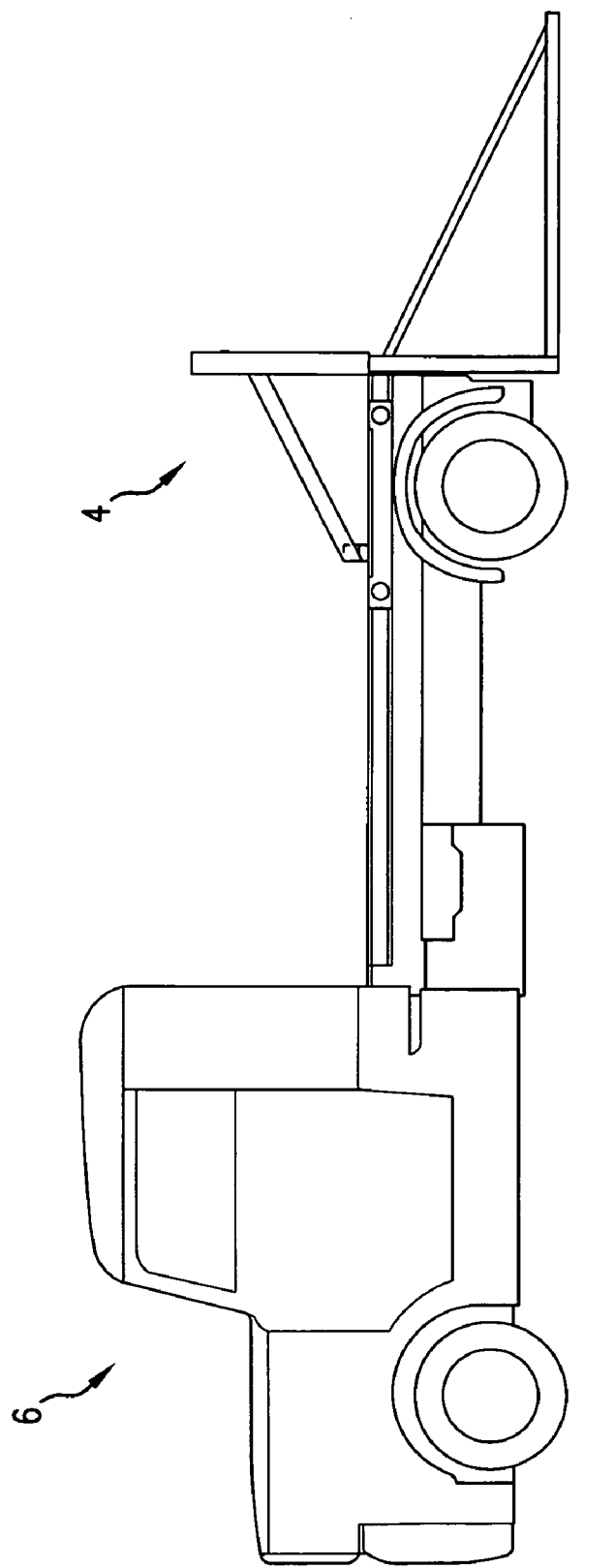
FIG. 7 is a side view of a vehicle quipped with a lift fully lowered.

FIG. 7 is a side view of a vehicle 6 quipped with a lift 4 fully lowered. At this point the container 2 not visible can be secured. The lift 4 is also configured to lift and transport Dumpster® brand containers. The lift 4 is also configured as a rack to lift or carry any material.

Figure 8:
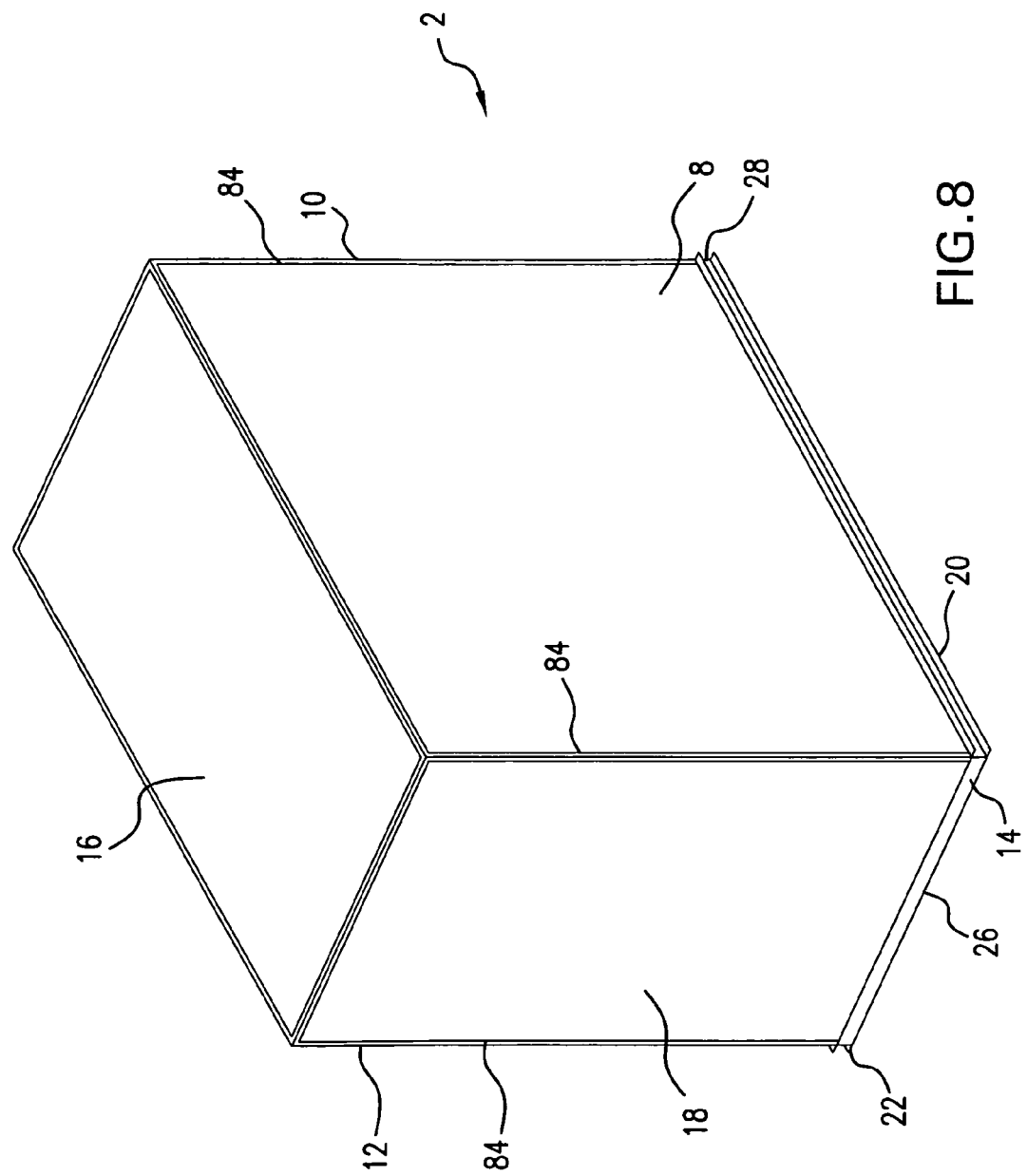
FIG. 8 is a perspective view of a specialized container.

FIG. 8 is a perspective view of a specialized container 2. The container comprises in combination a first wall 8; a second wall 10, a third wall 12, a top wall 16, a bottom wall 14 and a door 18. The door 18 in this embodiment is a rolling door 18. However, the door can be any door that serves the purpose of a door. For example the door 18 can be a sliding door, bi-folding door and removable door. The container 2 is secured within a framework consisting of a first side channel 20, a second side channel 22, a bottom near end 26 and a bottom distal end 28. Also each corner is secure to one another via the corner angle upright 84. The container 2 is capable of being insulated.

Figure 9:
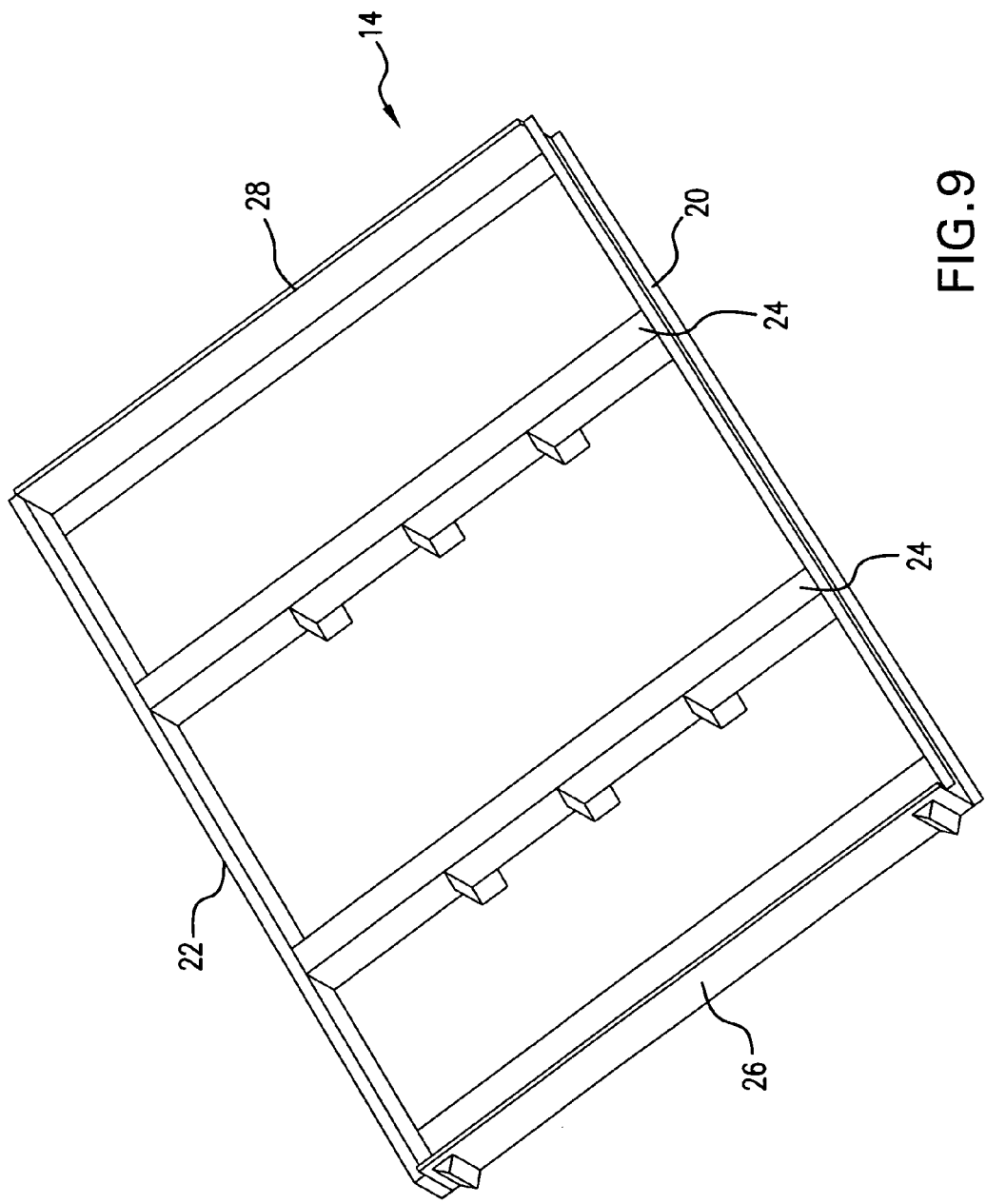
FIG. 9 is top view of a bottom of a specialized container floor.

FIG. 9 is top view of a bottom or floor 14 of a specialized container 2. The bottom 14 consists of a framework that connects the first side channel 20 and the second side channel 22 with the bottom near end 26 and the bottom distal end 28. This bottom 04 is further supported with bottom supports 24. The number of bottom supports 24 varies by the length of the particular container 2 manufactured.

Figure 10:
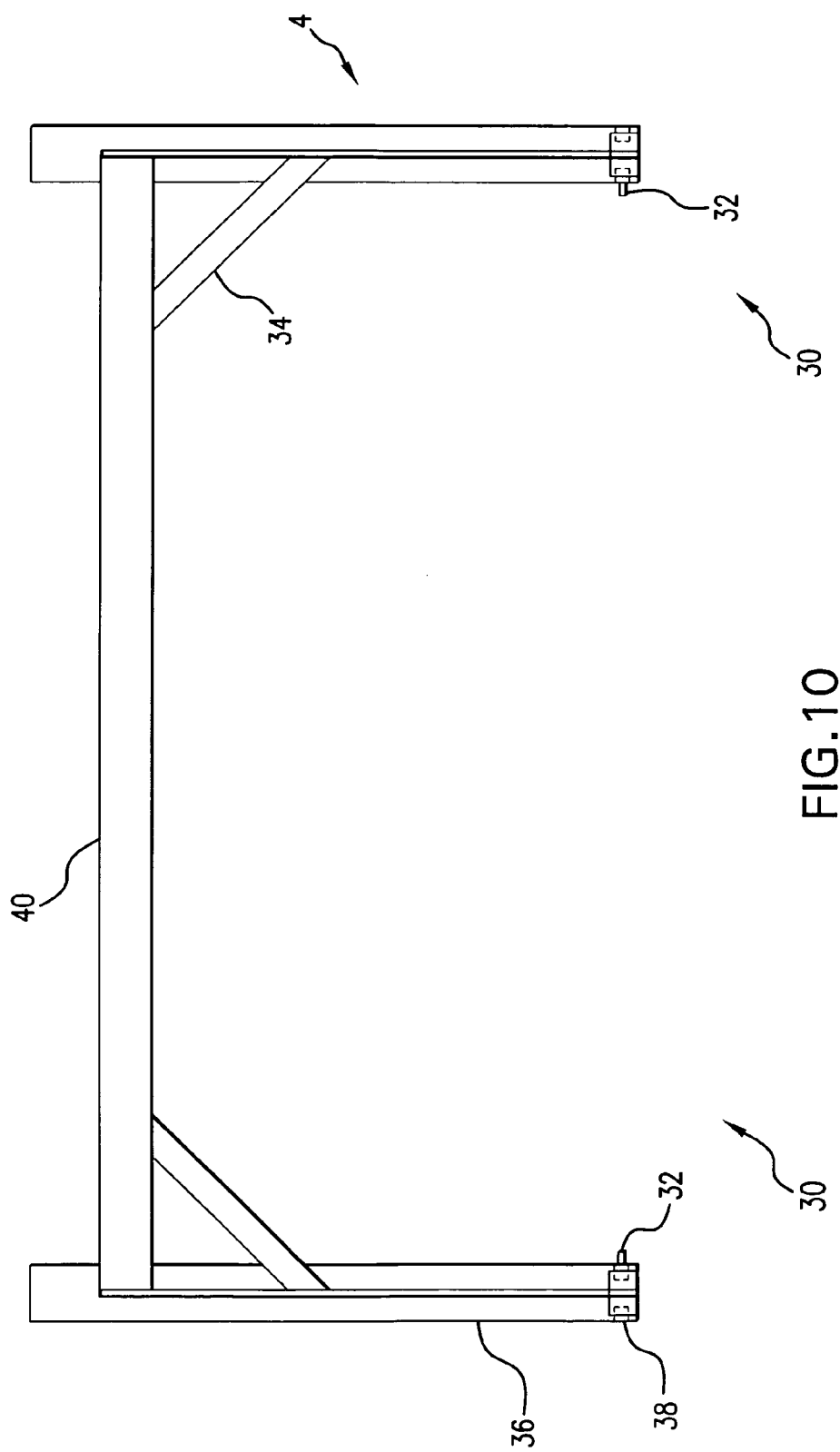
FIG. 10 is a rear view of the lift mechanism and the arm bracket.

FIG. 10 is a rear view of the lift mechanism 4 and the arm brackets 30. These arm brackets 30 engage the first side and second side channels 20 and 22 of the bottom 14 of the container 2. When the arm brackets are within the first and second channels 20 and 22 the container 2 can be lifted. The arm brackets 30 are connected to a cross member 40 known as the lower leg cross member 40. The cross member 40 has a support member 34 attached between lower leg 36 and the cross member 40. Not visible is a hydraulic piston 56 that raises and lowers the arm brackets 30. The hydraulic pistons 56 are within the first lower leg 36 and the second lower leg 42. The attachment points 38 for the hydraulic piston 56 are visible as well as the pins 32 that secure the hydraulic pistons 56.

Figure 11:
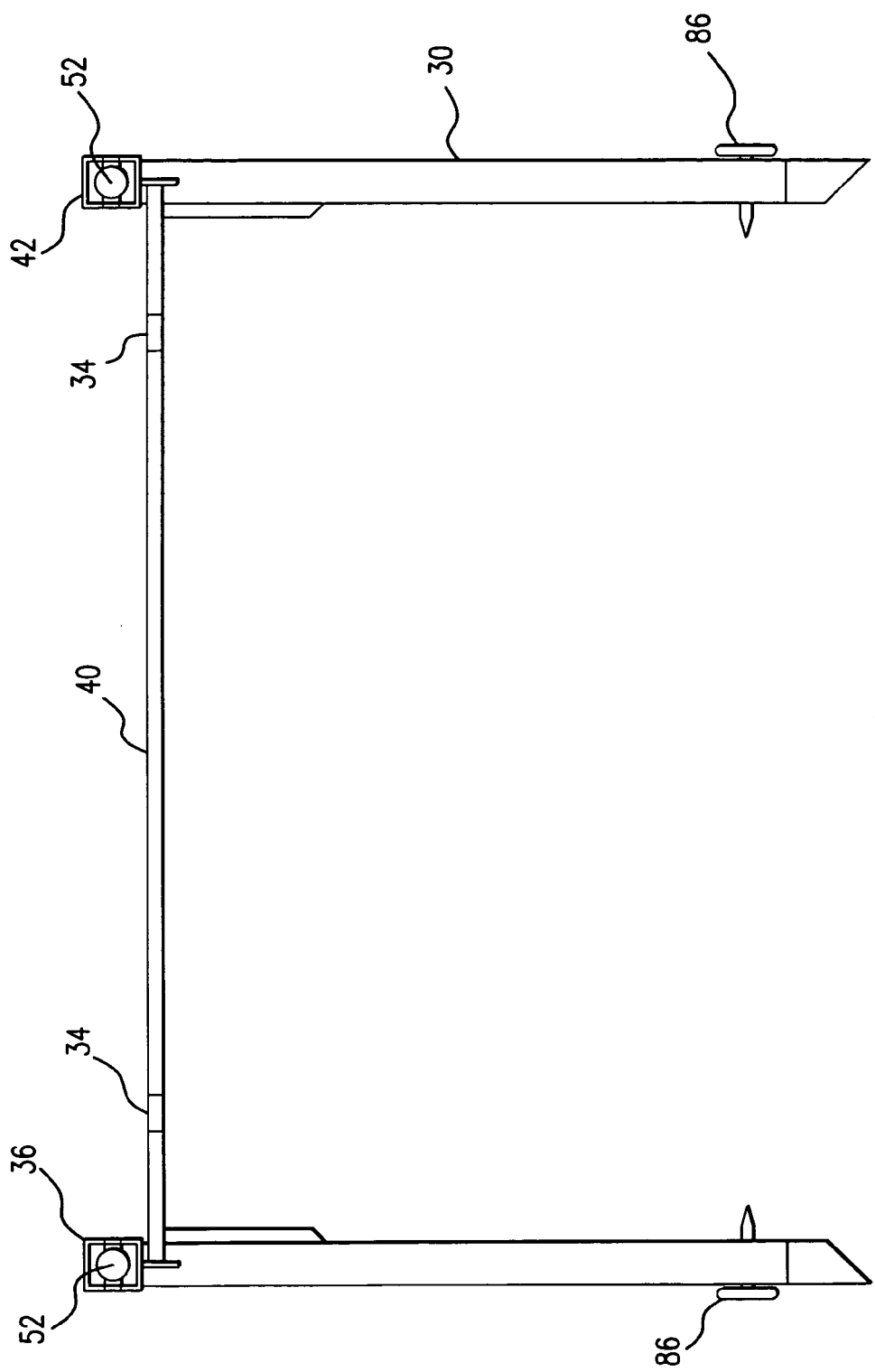
FIG. 11 is a top view of the arm bracket.

FIG. 11 is a top view of the arm brackets 30. Also visible are the arm bracket 30 pins 86 for securing the container in place. It is also clear the relationship between the arms 30 and the cross member 40. In phantom is the lower leg cross member supports 34. Also visible are the lower legs 36 and 42. Within the lower legs 36 and 42 are the vertical hydraulic cylinders 52. It is necessary to point out that the locking mechanism can be a variety of methods. The locking can be manual or automatic. Other locking mechanism includes but is not limited to pins, latches, skid plates, spring loaded clips and others.

Figure 12:
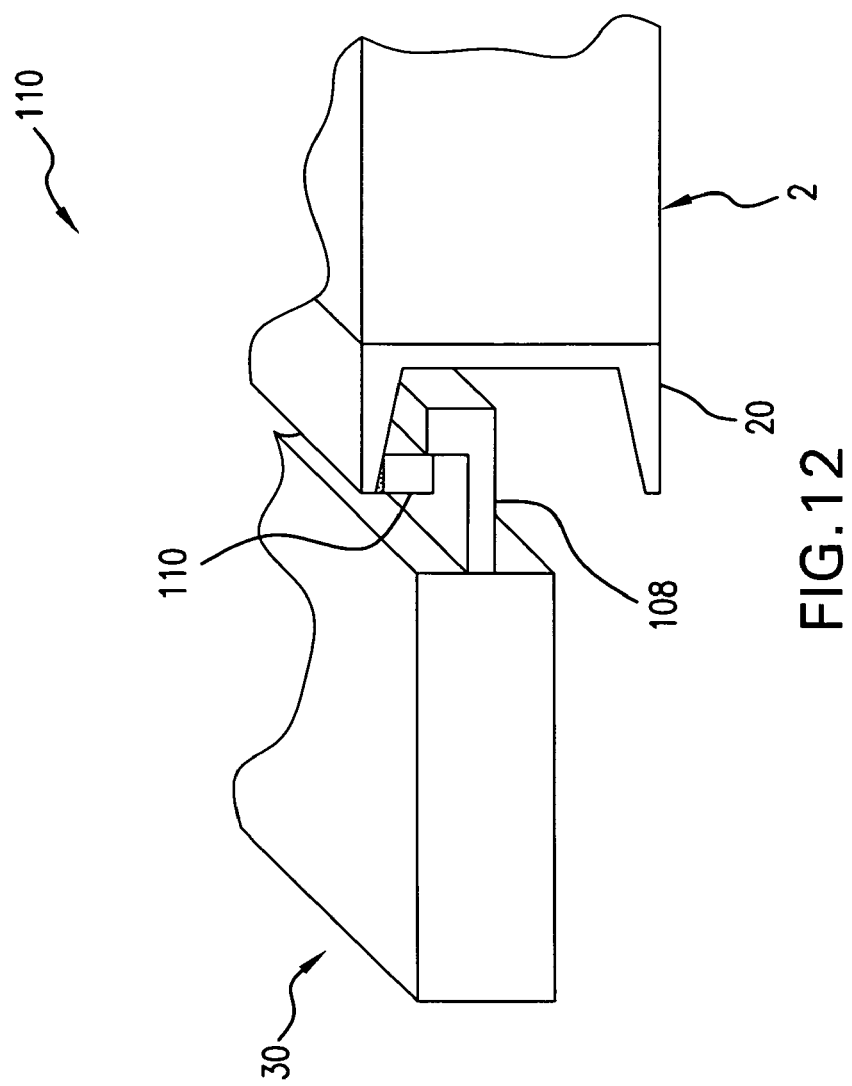
FIG. 12 is another embodiment of the of the arm bracket locking mechanism using skid plates.

FIG. 12 is another embodiment of the of the arm bracket locking mechanism using skid plates 108. Here the arm bracket 30 is equipped with a skid plate 108 that locks into the first side channel 20 of container 2. The side channel 20 is also equipped with a skid plate 110. The skid plates 108 and 110 inter lock to secure container 2 to the arm bracket 30 for loading, unloading, lifting and transporting of the container 2.

Figure 13:
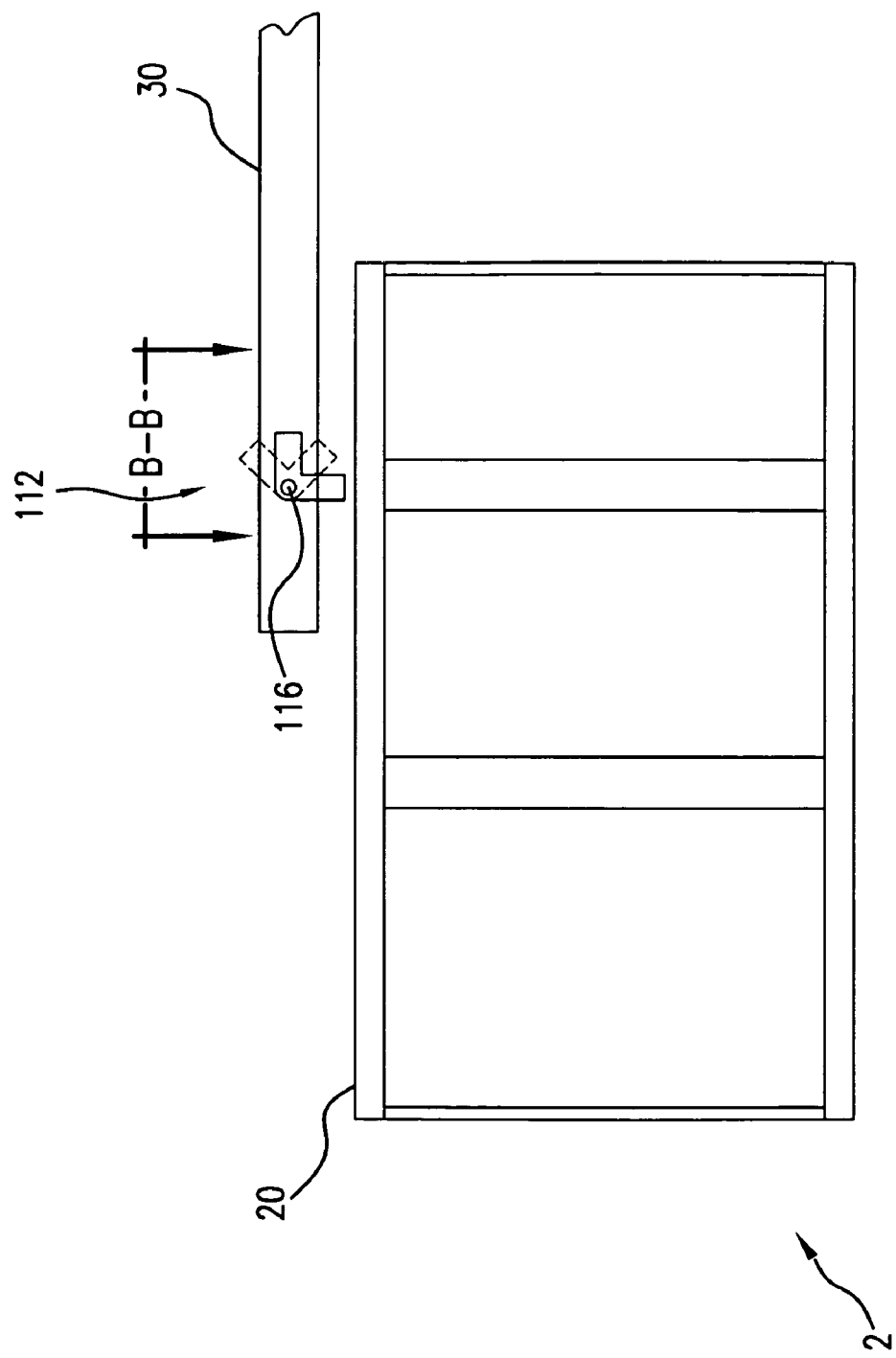
FIG. 13 is another embodiment of the arm bracket locking mechanism using spring loaded clips.

FIG. 13 is another embodiment of the arm bracket locking mechanism using spring loaded clips 112. The arm bracket 30 moves along the first side channel 20 and the spring loaded clips 112 are deployed. The clips move on the pivot point 116 engaging the first side channel 20 allowing the container to be lifted.

Figure 14:
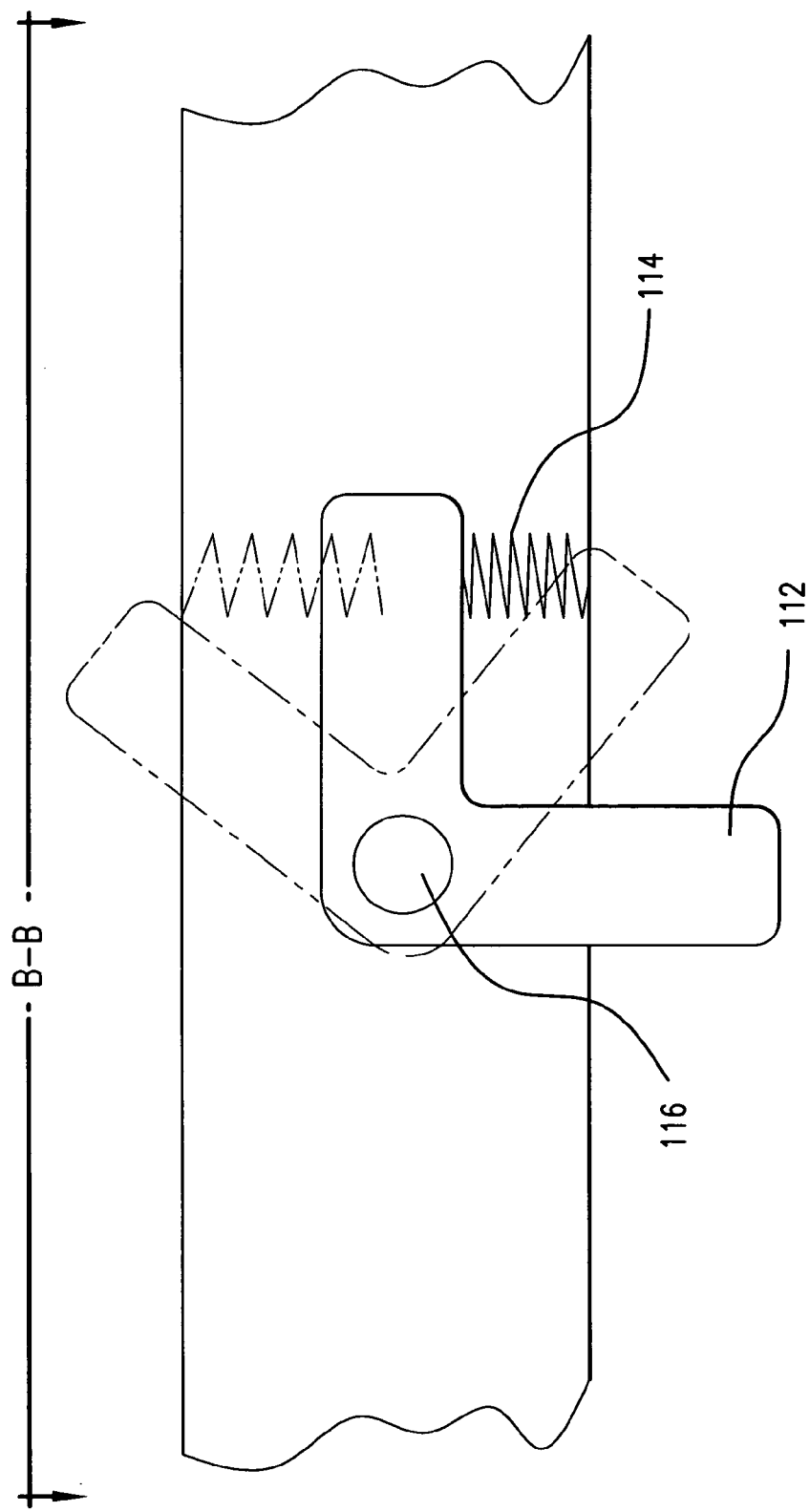
FIG. 14 is an expanded view of line B-B of FIG. 13 showing the spring loaded clips.

FIG. 14 is an expanded view of line B-B of FIG. 13 showing the spring loaded clips 112. The clips 112 are moved by the spring bias of springs 114 to the deployed position and then back the non-deployed position.

Figure 15:
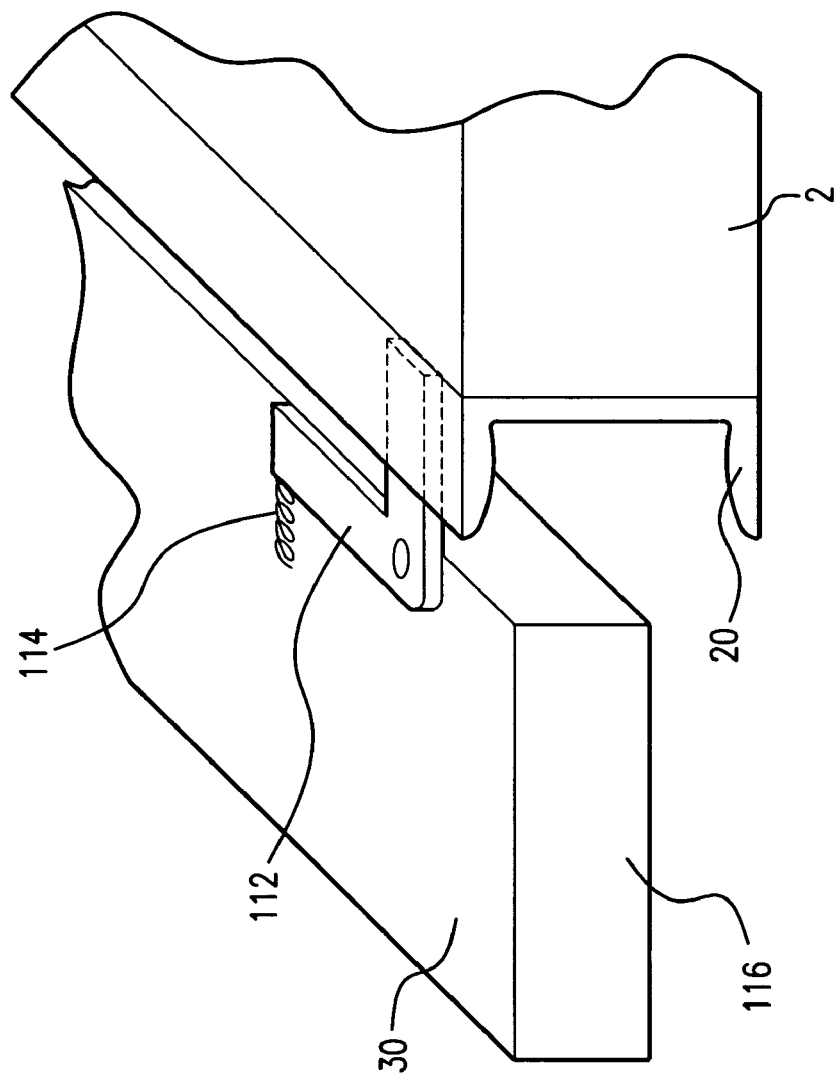
FIG. 15 is a perspective view of the lift mechanism deployably mounted to a vehicle with the arm bracket lowered.

FIG. 15 is an expanded view of the spring clips 112. This perspective shows the engagement of the spring clip 112 with the first side channel 20 of the container 2.

Figure 16:
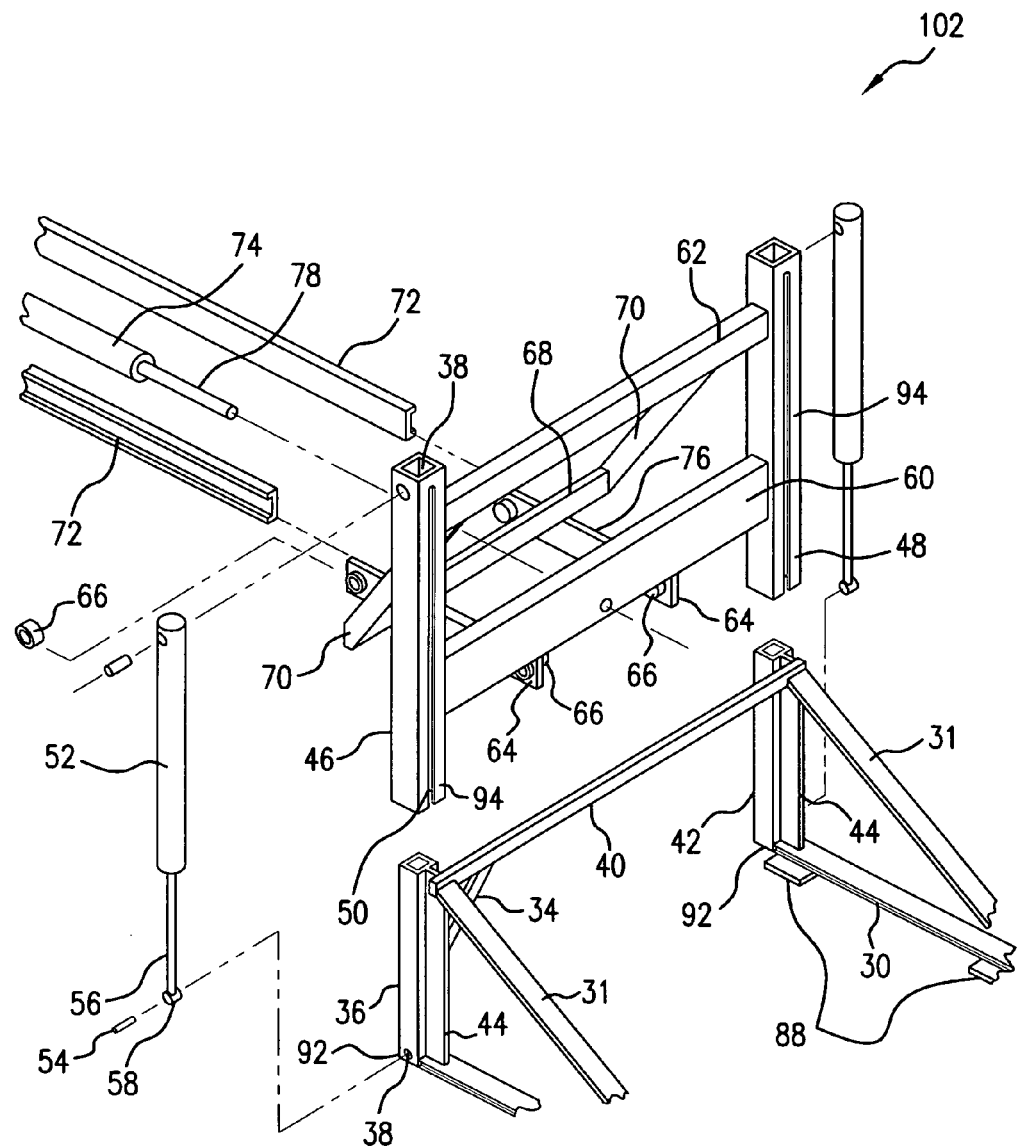
FIG. 16 is a top view of another embodiment of the lift drive system with mechanism starting position.

FIG. 16 is a perspective view of the lift mechanism 4 deployably mounted to a vehicle 6 with the arm bracket 30 lowered. This perspective is extremely important in that it shows the lift mechanism 4 and its relationship to the vehicle 3. The first lower leg 36 and the second lower leg 42 are attached to the hydraulic pistons 56 at attachment point 38. These lower legs 36 and 42 have a flange 44 attached to their front surface 90. The lower leg cross member 40; connect lower legs 36 and 42 for simultaneous movement. This lower leg cross member 40, support 34 and arm brackets 30 are attached to this flange 44. The arm brackets 30 are attached to the flange 44 and the lower leg 36 and 42 at the lower legs 36 and 42 distal end 92. The reason that cross member 40 support 34 and arm brackets 30 are attached to the flange is the lower leg member 36 and 42 ride inside the first and second leg towers 46 and 48. These leg towers 46 and 48 have slot 50 in each of their front surfaces 94. The flange 44 of the lower leg member 36 and 40 move vertically within slot 50. The hydraulic cylinder 52 is attached in the near end 96 of the leg tower 46 and 48 at attachment point 58 by pin 54. The hydraulic cylinder 52 has an arm 56 that is attached to the inside 98 of the lower legs 36 and 42. Each leg tower 46 and 48 and lower legs 36 and 40 are configured the same. This means that both leg towers 46 and 48 have a hydraulic cylinder 52 and hydraulic piston 56. Both are attached in the same manner. The near end 100 of the hydraulic cylinder 52 is attached inside of the leg towers 46 and 48 at attachment point 58 with the pin 54. This is the essence of the lift mechanism 4.

When the lower legs 36 and 40 are lifted internally of the leg towers 46 and 48 the lift mechanism 4 can be operated in a forward or backward motion providing the container with the ability to be loaded on to the vehicle 6 for transport. In the dame manner if the container 2 is all the way forward from transporting the container 2 it can be mover rearward for unloading. This is accomplished through the roller system 102. The vehicle 6 is equipped with rails 22. The roller system 102 uses these rails 22 to move the container 2 from a loaded position to an unloading position and vise versa. The rollers 66 are attached to the inside surface 104 of the roller frame 64. The roller frame cross member 68 and the upper lift cross member 62 are attached to the top surface 106 of the roller frame 64. The roller frame cross member 68 has a support 70 that runs from the cross member 68 to leg tower upper cross member 60. The forward and rearward movement of the lift mechanism is controlled by the horizontal hydraulic cylinder 74. This hydraulic cylinder 74 has an arm 78 that attaches to lift cross member 60. The operation of the horizontal hydraulic cylinder 74 move the lift mechanism 4 along the rails 22 via the rollers 66 of the roller system 102 moving the lift 4 forward or backward depending on the desired direction.

Figure 17:
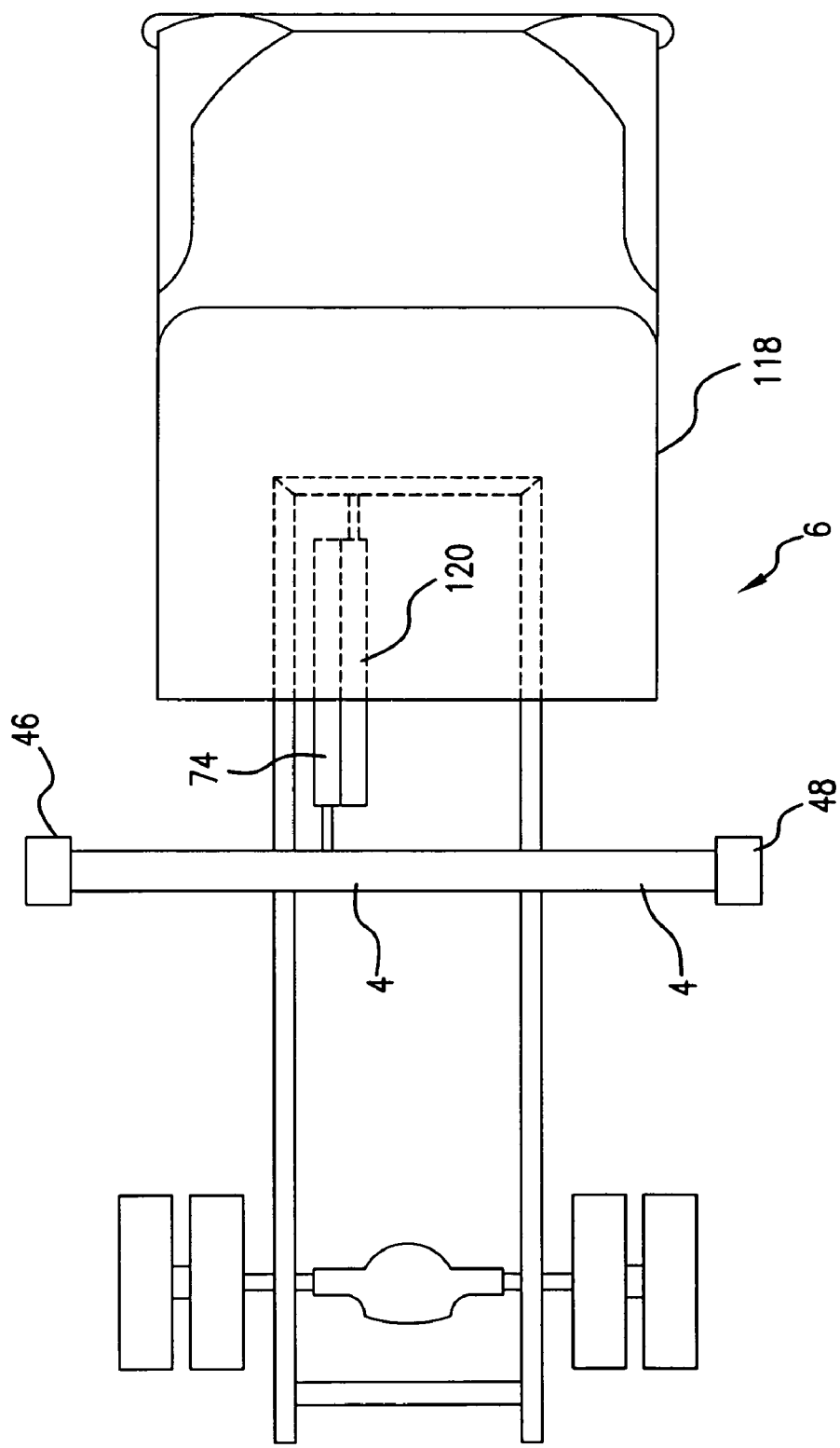
FIG. 17 is a top view of another embodiment of the lift drive system with the mechanism fully extended.

FIG. 17 is a top view of another embodiment of the lift drive system with the mechanism in its starting position. This embodiment uses a dual hydraulic cylinder system. Hydraulic cylinder 74 is joined by a second hydraulic cylinder 120. This hydraulic cylinder 120 moves the other hydraulic cylinder 74 away from the cab 118 of the vehicle 6. At the same time the hydraulic cylinder 74 is moving away from the cab 118 of the vehicle 6 the lift mechanism 4 is driven away from the hydraulic cylinder 74.

Figure 18:
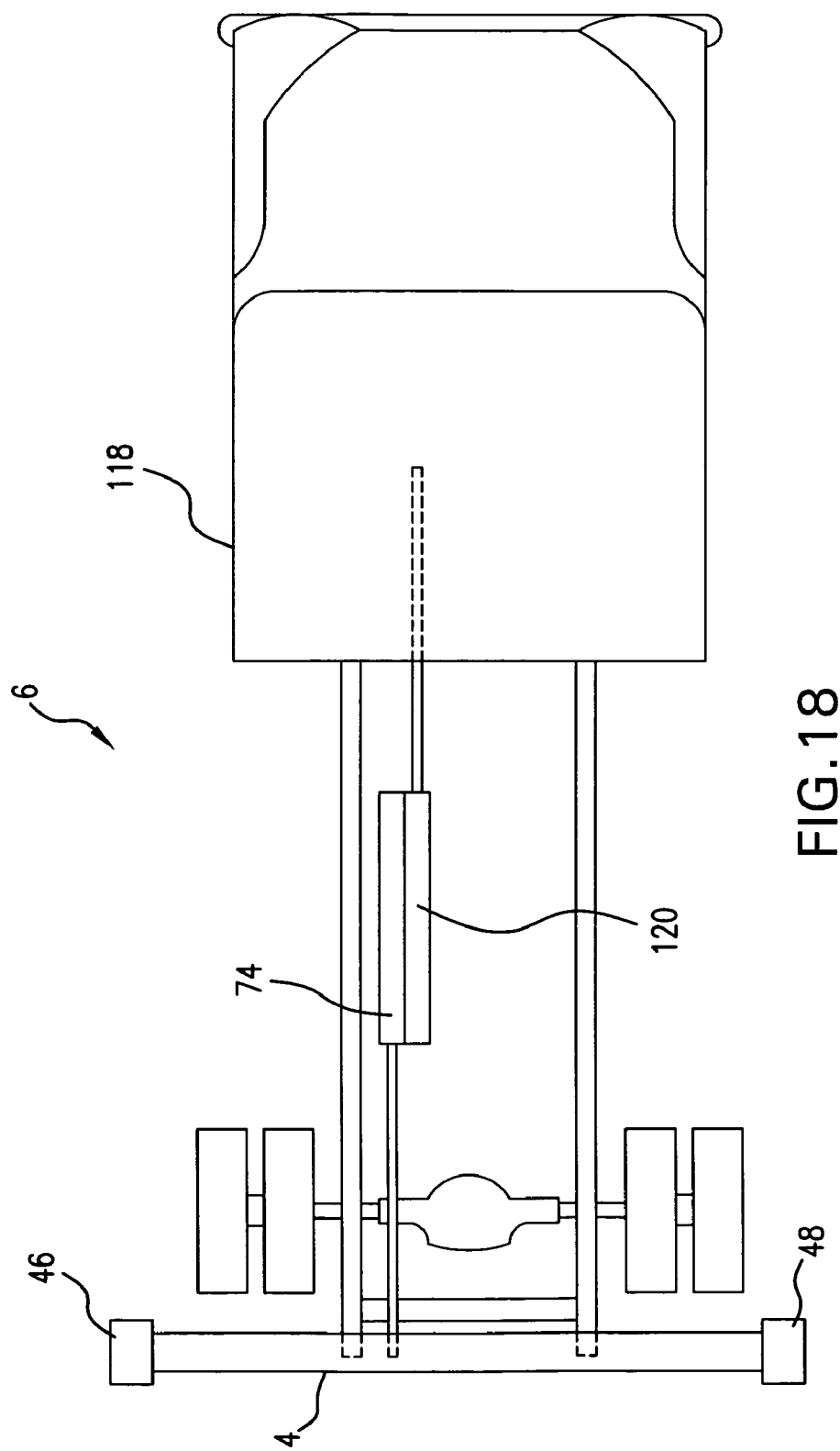
FIG. 18 is another embodiment of the lift drive mechanisms right left drive mechanism.

FIG. 18 is a top view of another embodiment of the lift drive system with the mechanism fully extended. Here hydraulic cylinder 74 and 120 are fully deployed.

Figure 19:
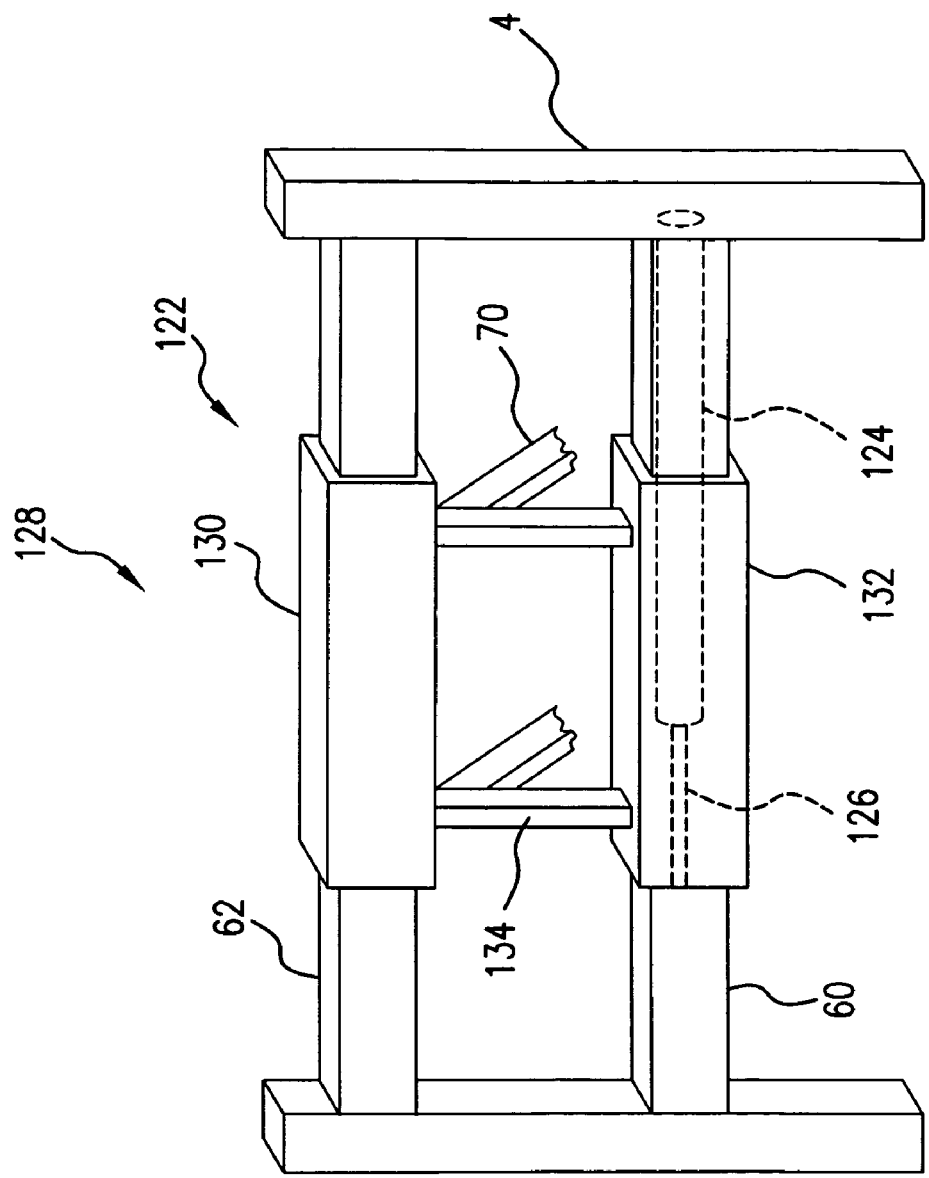
FIG. 19 is another embodiment of the lift mechanisms drive centering mechanism.

FIG. 19 is another embodiment of the lift mechanisms 4 centering drive mechanism 122. This centering drive 122 uses a hidden hydraulic cylinder 124 that drives a hydraulic piston 126 that moves the lift mechanism 4 either right or left. There is a stationary frame assembly 128 that has a top frame 130 and a bottom frame 132. The bottom frame is connected to the hydraulic piston 126 and the hydraulic cylinder 124 is mounted to the lift cross member 60 of the lift mechanism 4. The movement of the piston 126 moves the entire lift mechanism 4 right or left to align it with the container 2. The top frame assembly 130 and the bottom frame assembly 132 are connected by the frame supports 134. The bottom frame assembly 132 rides over the lift cross member 60 and the top frame assembly rides over the upper leg cross member 62. The roller frame supports 70 secure the device to the roller frame of the vehicle 6. This embodiment, the centering drive 122, is hydraulically, mechanically or electrically driven and allows the operator to back up to a container lower the lift mechanism 4 and center the arm brackets 30 with a container 2. This allows the operator to move the lift mechanism 4 in a left or right direction to perfectly align the lift mechanism 4 with the container. This function can be performed either when loading or unloading to get exact alignment for a drop or a pick up saving valuable time and energy.

Figure 20:
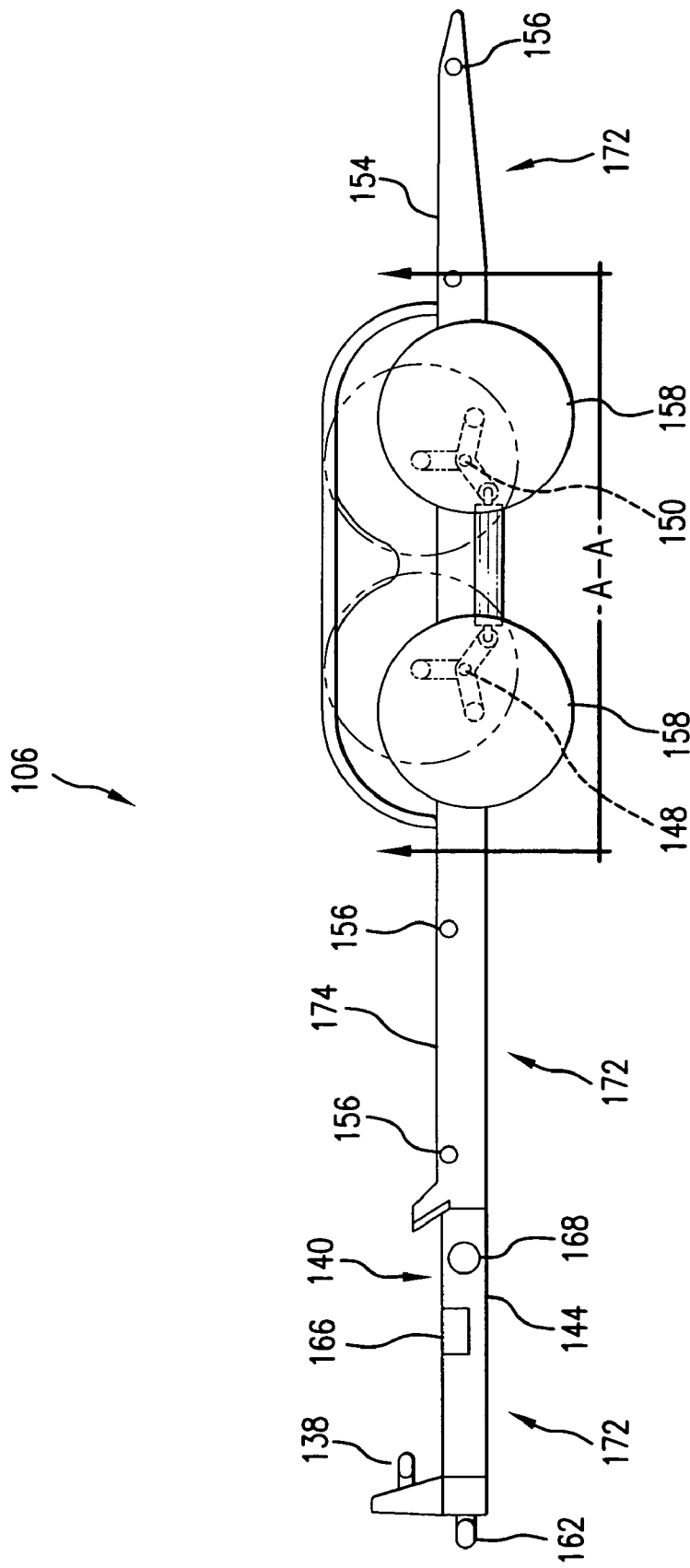
FIG. 20 is a side view of the trailer.

FIG. 20 is a side perspective of the trailer 106. The trailer 106 is manufactured to carry at least one container 2. The trailer 106 is equipped with a winch 138 that will pull the containers 2 onto the top surface 174 of the trailer 106. This winch 138 is mounted to the front end 140 of the trailer 106. The winch 138 is hydraulically powered by the hydraulic pump 168 which is energized by the trailer battery 166. Recessed within the trailer bed 154 are the rollers 156. These rollers 156 help convey the container 2 on and off the trailer 106. There is a plurality of rollers 156 in this embodiment. Each side of the trailer 106 has tie downs 172 that allow the containers to be secure for transportation. The front end 140 is also equipped with a hitch 162 for the transportation of the trailer 106. This hitch 162 can be any type of hitch from a class I, II, III, IV, V or gooseneck, fifth wheel and king pin. The unique character of the trailer 106 is its ability to be lowered to the ground. The axles 148 and 150 are equipped with a hydraulic arm assembly the will rotate each axle from a raised or lowered position. The raised position is for transportation of the trailer. When the axles are lowered the containers can be loaded or unloaded. When the trailer 106 is in the lowered position the beveled part of the trailer rests flat upon the ground. The axles 148 and 150 move the trailer tires 158 up and down lowering or raising the trailer bed 154. When the trailer tires 158 rises into the fender wells 160 the bed 154 and beveled portion 170 lower and when the tires 158 are lowered from the fenders 160 the trailer bed 154 and beveled portion 170 are lifted from the ground. When the beveled portion 170 at the rear end 142 of the trailer is on the ground the trailer winch 164 can pull a container 2 on the trailer using the roller system 156. When the container 2 is fully on the trailer it can be secured at the tie downs 172. There are tie downs 172 on both the first side 144 and the second side 146. Also visible is line A-A which is the hydraulic axle system.

Figure 21:
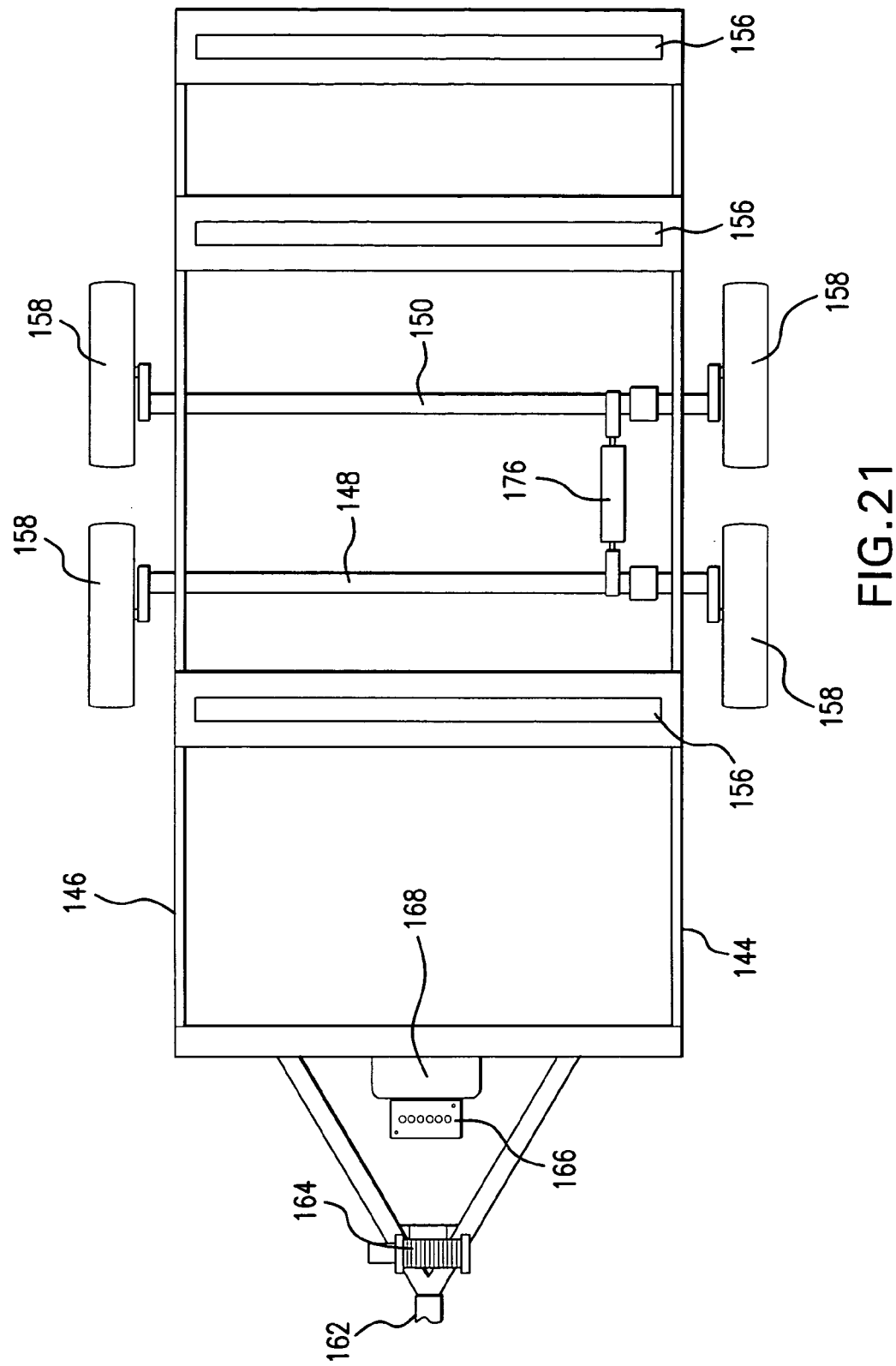
FIG. 21 is a top view of the trailer

FIG. 21 is a top view of the trailer. This view shows the rollers 156 and their relationship to the trailer bed 154 and the top surface 174. Both axels 148 and 150 are visible as well as the hydraulic axel system 176 which will be further explained in FIG. 22. The placement of the winch 164, battery 166 and the hydraulic pump 168 are clear from this view. The tires 158 of the trailer are also present.

Figure 22:
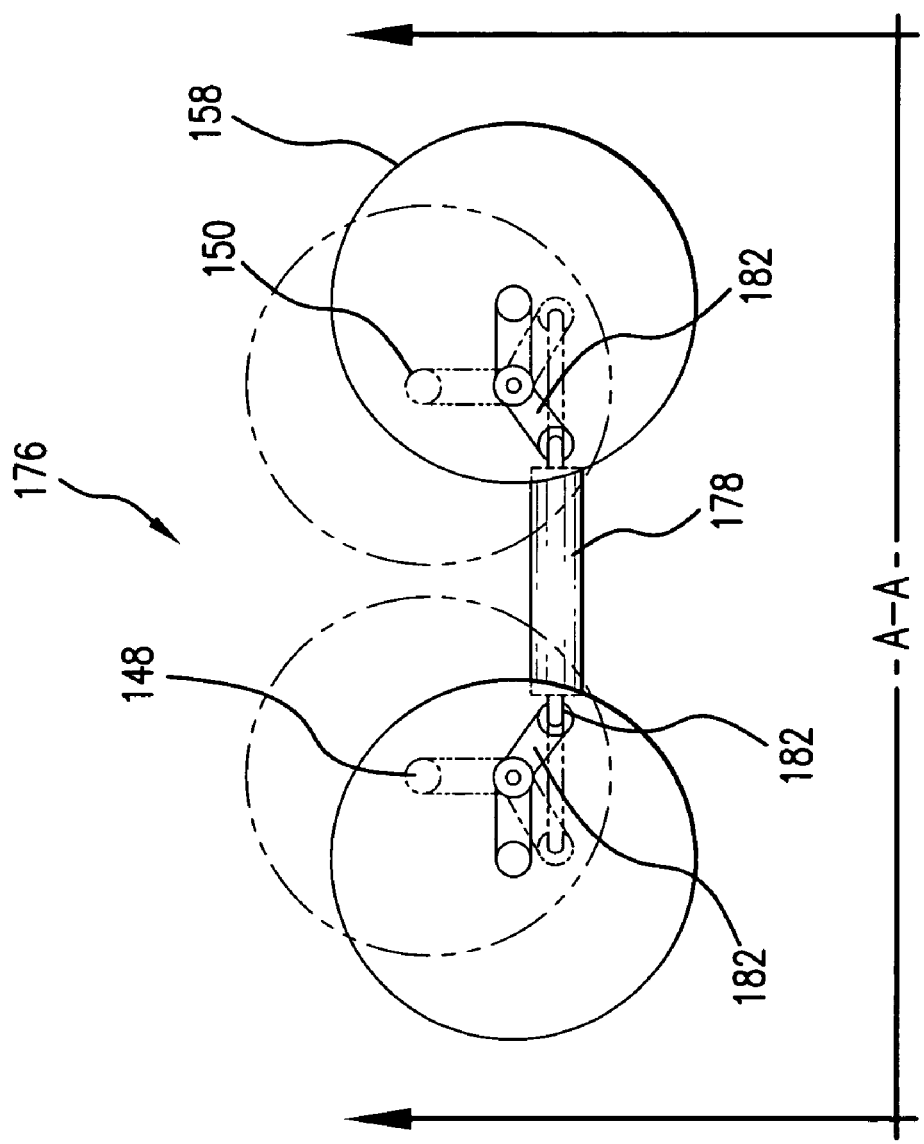
FIG. 22 is an expanded view of line A-A of FIG. 19.

FIG. 22 is an expanded view of line A-A of FIG. 20. The hydraulic pump 168 drives the hydraulic axel system 176. The hydraulic unit 178 drives a hydraulic piston 180. When the unit 178 drives the piston 180 it moves the hydraulic lever arms 182 which are attached to the axels, in turn moving the axels raising and lowering the axels. The raising and lowering of the axles raises and lowers the bed of the trailer facilitating the loading and off loading of the containers 2.

When a container is secured on the lift system 4 and all the way forward, the container is in the transportation mode. When the vehicle 6 arrives at the designated site to unload or drop the container the following transpires. The operator directs the horizontal cylinder 74 to drive the roller system 102 toward the rear of the vehicle 6. When the horizontal cylinder has moved the roller system a far rearward as possible the operator directs the horizontal cylinder 52 to move the lift mechanism to the ground lowering the container 2. The pins 86 that secure the container to the arm brackets 30 are removed and the vehicle pulls ahead clearing the arm brackets 30 from the container 2. The vertical hydraulic cylinder 52 is raised until the lower legs are in the raised position or as far as they can move into the leg towers 46 and 48. Then the horizontal cylinder is activated and the roller system 102 moves the lift mechanism 4 forward until it is all the way forward on the vehicle 6.

What is claimed is:

1. A containerized freight system that comprises in combination a specialized container, a lift mechanism and a transportation unit;
    said specialized container comprising a combination of a framework, 3 walls, a top, a bottom and at least one door;
    said frame work consisting of two opposing outside channel members, two base side angle members, two base end angles, at least four upright members, two side top angle members and two top end angle members;
    said wall portions comprising two segments from said base angle members extending to said top angle members forming two side walls;
    said wall portions comprising one segment from said one base end angle extending to said one top end angle forming one end;
    each said wall and end segment extending along and secured to two upright members;
    each said wall being capable of containing insulation;
    said top being a segment extending from said top side angles members to said top end angles forming said top;
    said bottom being a segment extending from said base side angle members to said base end angles forming said bottom;
    said door being a segment extending from said base end angle member to said top end angle member and extending along of two uprights forming said door;
    said lifting mechanism comprising in combination; at least one leg tower, said leg tower having a near end, a distal end and a front surface, said leg towers front surface having a leg tower slot,
    at least one vertical hydraulic cylinder, said vertical hydraulic cylinder having a near end and a distal end,
    an upper tower cross member, said upper tower cross member having a near end and a distal end,
    a main cross member, said main cross member having a near end and a distal end,
    at least one leg member, said leg member having a near end and a distal end,
    at least one leg flange, said leg flange having a near end and a distal end,
    a lift cross member, said lift cross member having a near end and a distal end,
    at least one channel engaging lateral, said channel engaging lateral having a near end and a distal end,
    at least one channel engaging lateral support member, said channel engaging lateral having a near end and a distal end,
    at least one channel engaging lateral angled support, said channel engaging lateral angled support having a near end and a distal end, and a retaining pin;
    said transportation unit comprising in combination; a vehicle with said lifting mechanism attached thereto, said lift mechanism being attached to a frame roller system that conveys said lifting mechanism along a frame assembly mounted to said vehicle, said lifting mechanism being conveyed along said frame assembly via a horizontal hydraulic cylinder mounted to said vehicle,
    said roller system having a first side and a second side, said first side having at least one roller attached thereto, each first and second side being attached to said lifting mechanism, each said roller being engageable to said vehicle frame assembly, said frame assembly allowing the roller system to move along the frame assembly in a forward and backward motion being driven by a horizontal hydraulically cylinder for the purpose of loading, unloading and transporting said specialized containers,
    said transportation unit also comprising a trailer unit, said trailer unit having a front end, a rear end, at least one side, at least two axles, a frame, a trailer bed, a plurality of rollers and a plurality of tires,
    said front end consisting of a hitch, a winch, a battery and a hydraulic pump;
    said rear end having a beveled edge allowing for ground engagement,
    each said side having a length that will accommodate at least two containers end to end,
    said axles having the capability to rotate mechanically upward and downward from its original position,
    said frame being capable of supporting at least to specialized containers loaded or unloaded,
    said trailer bed being capable of supporting at least two containers,
    said plurality of rollers being incorporated into the top surface of the trailer bed to facilitate the movement of the specialized containers on and off of the trailer,
    said tires being attached to said axles and supporting the trailer for the transportation of said specialized containers,
    said trailer having a plurality of tie downs.

2. A containerized freight system as claimed in claim 1 wherein said door of said specialized container is a bi-folding door.

3. A containerized freight system as claimed in claim 1 wherein said door of said specialized container is rolling.

4. A containerized freight system as claimed in claim 1 wherein the lift mechanism is hydraulically driven.

5. A containerized freight system as claimed in claim 1 wherein the lift mechanism is electrically driven.

6. A containerized freight system as claimed in claim 1 wherein the lift mechanism is hydraulically and electrically driven.

7. A containerized freight system as claimed in claim 1 wherein said specialized container is manufacture from a group consisting of the following wood, metal, plastic and recycled plastic.

8. A containerized freight system as claimed in claim 1 wherein said specialized container is manufactured from a combination from the group consisting of wood, metal, plastic, fiberglass, fiberglass wall board, carbon fiber and recycled plastic.

9. A containerized freight system as claimed in claim 1 wherein a vehicle is modified with the lift system.

10. A containerized freight system as claimed in claim 1 wherein said specialized container is pinned to said lift mechanism.

11. A containerized freight system as claimed in claim 1 wherein said specialized container is insulated.

12. A containerized freight system as claimed in claim 1 wherein said lift system moves horizontally.

13. A containerized freight system as claimed in claim 1 wherein said hydraulic system is driven by an electric pump.

14. A containerized freight system as claimed in claim 1 wherein said hydraulic system is driven by a power take off from transport vehicle.

15. A containerized freight system as claimed in claim 1 wherein said hydraulic system is driven by a fuel powered pump.

16. A containerized freight system as claimed in claim 1 wherein said wherein locking mechanism is manual.

17. A containerized freight system as claimed in claim 1 wherein said wherein locking mechanism is automatic.

18. A containerized freight system as claimed in claim 1 wherein said wherein locking mechanism is pins.

19. A containerized freight system as claimed in claim 1 wherein said wherein locking mechanism is latches.

20. A containerized freight system as claimed in claim 1 wherein said wherein locking mechanism is skid plates.

21. A containerized freight system as claimed in claim 1 wherein said wherein locking mechanism is spring loaded clips.

22. A trailer as claimed in claim 1 wherein said roller system is bar rollers spanning the width of said trailer.

23. A trailer as claimed in claim 1 wherein said roller system is a series of roller bearings.

24. A trailer as claimed in claim 1 wherein said roller system is a series of conveyor type rollers.

25. A trailer as claimed in claim 1 wherein said axles rotate by mechanical operations.

26. A trailer as claimed in claim 1 wherein said axles rotate by electrical operations.

27. A trailer as claimed in claim 1 wherein said axles rotate by hydraulic operations.

28. A trailer as claimed in claim 1 wherein said axles rotate in an upward and downward motion.

29. A trailer as claimed in claim 1 wherein said axles rotate independently of one another.

30. A trailer as claimed in claim 1 wherein said axle rotation allows said rear end of said trailer to come into contact with the ground.

31. A trailer as claimed in claim 1 wherein said winch moves said containers onto and off of said trailer.

32. A winch as claimed in claim 1 wherein said winch is hydraulically operated.

33. A winch as claimed in claim 1 wherein said winch is electrically operated.

34. A winch as claimed in claim 1 wherein said winch is manually operated.

35. A rotatable axle as claimed in claim 1 wherein said axle is hydraulically operated.

36. A rotatable axle as claimed in claim 1 wherein said axle is an electrically operated.

37. A rotatable axle as claimed in claim 1 wherein said axle is manually operated.

38. A rotatable axle as claimed in claim 1 wherein said axle is mechanically operated.

39. A trailer as claimed in claim 1 wherein said trailer is is sized for hauling one specialized container.

40. Rotating axles as claimed in claim 1 wherein axle rotation raises said tires lowering said trailer rear end to ground level.

41. Rotating axles as claimed in claim 1 wherein axle rotation lowers said tires raising said rear end of said trailer.

42. A trailer as claimed in claim 1 wherein said roller system of the trailer is retractable.

43. A trailer as claimed in claim 1 wherein said axles support tires of a single rim.

44. A trailer as claimed in claim 1 wherein said axles support tires of duel rims.

45. A trailer as claimed in claim 1 wherein said trailers front end, rear end and sides have openings therethrough, hooks, latches, rings, strap system are present for the purpose of binding said containers to said trailer.

46. A containerized freight system as claimed in claim 1 wherein the lift mechanism is capable of lifting and transporting a Dumpster® brand container.

47. A containerized freight system as claimed in claim 1 wherein the lift mechanism is a rack for lifting and transporting.

48. A trailer as claimed in claim 1 wherein said trailer is capable of lifting and transporting a Dumpster® brand container.

* * * * *